July 11, 1933.  W. A. BURNS  1,917,824
VEHICLE BODY
Filed July 30, 1932  4 Sheets-Sheet 1
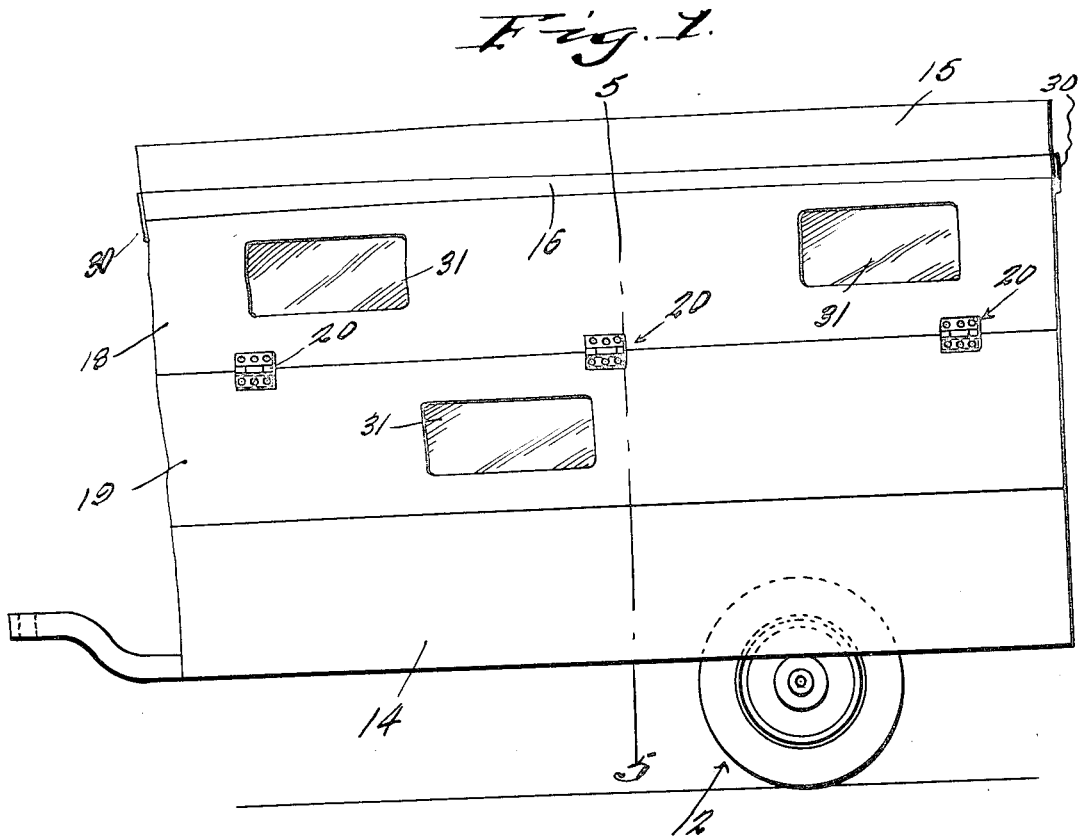
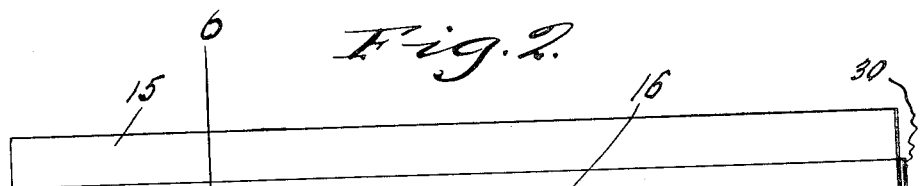

July 11, 1933. W. A. BURNS 1,917,824

Filed July 30, 1932

Inventor
W. A. Burns

By *Clarence A. O'Brien*
Attorney

July 11, 1933.  W. A. BURNS  1,917,824
VEHICLE BODY
Filed July 30, 1932  4 Sheets-Sheet 4
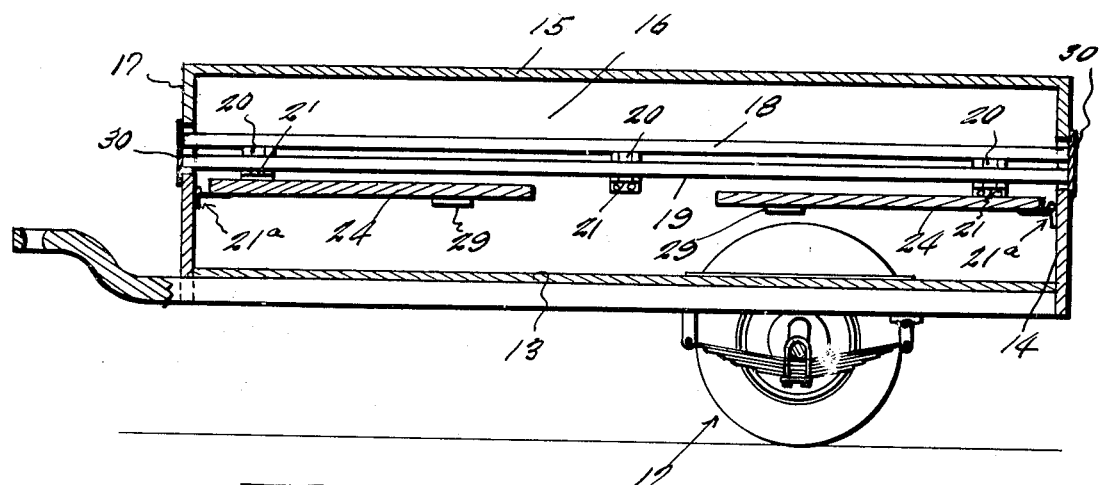
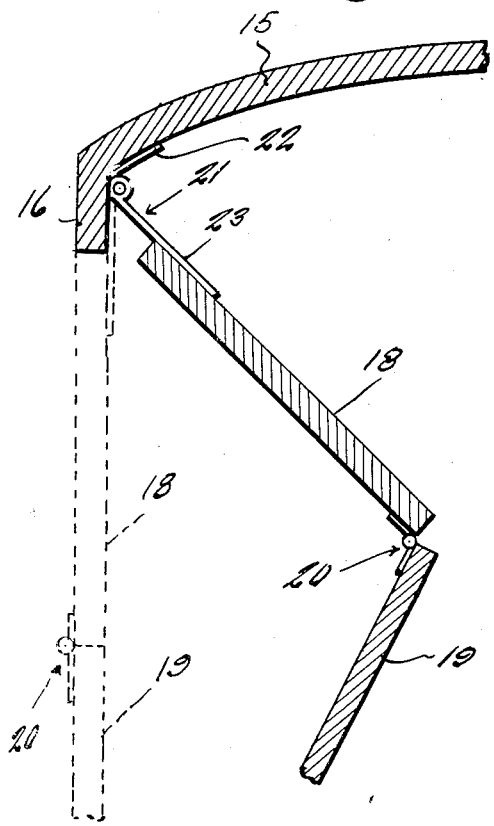
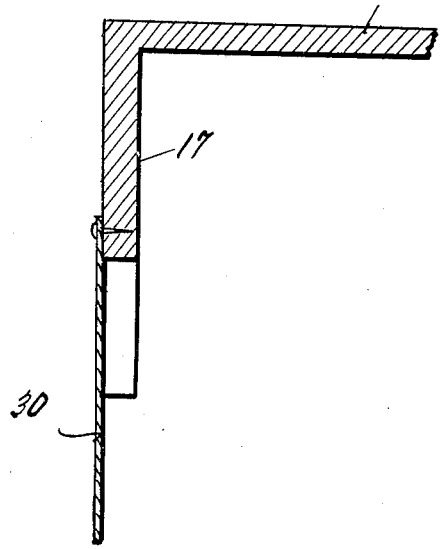
Inventor
W. A. Burns
By Clarence A. O'Brien
Attorney Patented July 11, 1933

1,917,824

UNITED STATES PATENT OFFICE

WILLIAM ALDEN BURNS, OF GRAND RAPIDS, MICHIGAN

VEHICLE BODY

Application filed July 30, 1932. Serial No. 626,875.

This invention relates to an improved vehicle body construction embodying hingedly connected foldable portions adapted to be collapsed into concentrated relationship for effective road transportation purposes.

Although the inventive conception comprehends an arrangement adapted to many different kinds of vehicle bodies, it has more specific reference to a two-wheeled trailer of the type primarily designed for outing and camping purposes.

My principal aim is to generally improve upon structures of this general classification by providing an arrangement which is simple, economical, strong and durable, easy to collapse and erect, and otherwise practical and susceptible of fulfilling the requirements of a foldable trailer.

The outstanding feature of the invention is the unusual compactness and convenience of the structure when in a folded state, whereby to permit the proportional dimensions to be reduced to a minimum to minimize wind resistance when the trailer is in motion, and to lower the center of gravity so as to guard against overturning and to relieve the lead or power vehicle of unusual stress and strain.

Other features and advantages of the invention may become more readily apparent from the following description and drawings.

In the drawings:

Figure 1 is a side elevational view of the preferred embodiment of the trailer, showing the same set up for camping use.

Figure 2 is a side view of the structure collapsed or folded into compact form for convenient haulage or transportation.

Figure 3 is a rear end view of Figure 1.

Figure 4 is a rear end view of Figure 2.

Figure 5 is a central vertical section taken approximately on the plane of the line 5—5 of Figure 1, showing the structure partly folded.

Figure 6 is a transverse vertical section on the line 6—6 of Figure 2.

Figure 7 is a longitudinal sectional view on the line 7—7 of Figure 4.

Figure 8 is a fragmentary detail sectional view.

Figure 9 is a section taken on the plane of the line 9—9 of Figure 1.

Figure 10 is a detail section on an enlarged scale showing one of the special drop leaf hinges.

Before introducing the detailed description I again mention the fact that the structure herein illustrated and described is not necessarily limited to a camping trailer outfit. The inventive conception comprehends any sort of a vehicle body composed of foldable hinged walls and sections of the type herein illustrated.

For the purpose of convenient illustration, I have shown a two-wheeled trailer wherein the spring supported chassis 11 is of any appropriate construction and provided with rubber tire equipped wheels 12. The floor or bottom of the body is distinguished by the numeral 13 and this is surrounded by a rigid upstanding rim portion 14 which defines a receptacle to accommodate the hinged walls when in collapsed or folded position as seen for example in Figure 2.

The one-piece top is distinguished by the numeral 15 and provided with longitudinal depending side flanges 16 and end flanges 17.

The spaced parallel side walls are composed of upper and lower rectangular panels 18 and 19 having their meeting edges joined together by inwardly folding hinges 20. Special hinges 21 are provided for connecting the opposite outer edges of said panels with the top 15 and rim 14 respectively. For example, as seen in Figure 8, the hinge employed for this purpose comprises a short attaching leaf 22, and a relatively long clearance or drop leaf 23. The latter leaf 23 is fastened to the adjacent edge of the panels. This arrangement allows the two panels 18 and 19 to swing inwardly into converging relationship and then down into superposed relationship as seen in Figure 6. The hinges and panels and top are so proportioned as to allow the flanges 16 and 17 to come down into direct supporting relationship on the rim 14 so as to completely conceal and confine the folded panels within the area of the complete folded body.

The two end walls are substantially the same in construction and include complemental vertical panels or sections 24 whose lower ends are secured by the same type of hinges 21a to the inner side of the end walls of the rim 14. The rear end wall of the body includes a door 25 attached to one of the panels through the medium of hinges 26 to swing into overlapping relationship with said panel. The rim 14 may also be provided with a relatively small door 27 supported in place by hinges 28.

The numerals 29 in Figure 6 designate

July 11, 1933.  M. F. CARR  1,917,825
SEPARABLE SNAP FASTENER INSTALLATION
Filed Nov. 7, 1930
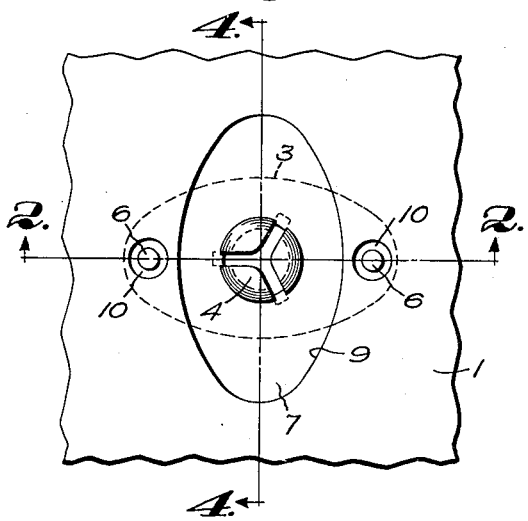
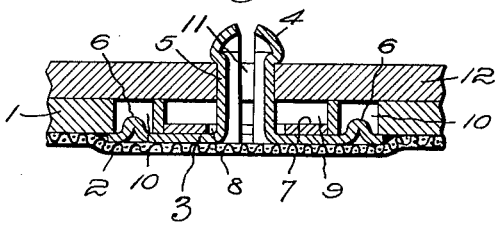
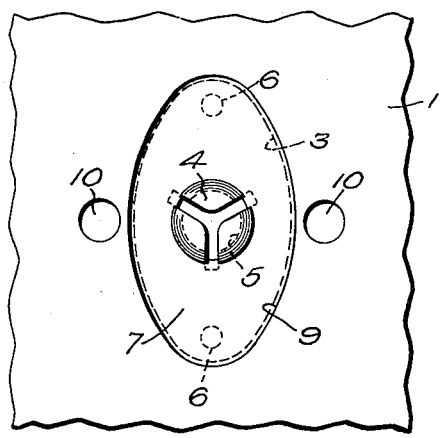
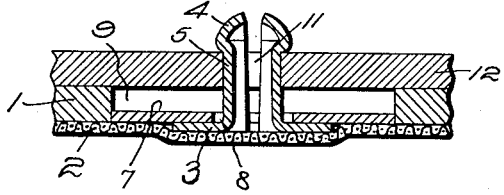
Inventor:
Moses F. Carr
by Emery, Booth, Varney & Townsend
Attys